United States Patent [19]

Gentiluomo

[11] Patent Number: 5,026,067

[45] Date of Patent: Jun. 25, 1991

[54] GOLF BALL

[76] Inventor: Joseph A. Gentiluomo, 1456 Belmont Ave., Schenectady, N.Y. 12308

[21] Appl. No.: 611,290

[22] Filed: Nov. 8, 1990

[51] Int. Cl.⁵ .............................................. A63B 37/06
[52] U.S. Cl. .................................. 273/220; 273/230; 273/228
[58] Field of Search ............... 273/218, 219, 220, 221, 273/230, 235 R, 62, 228, 229

[56] References Cited

U.S. PATENT DOCUMENTS

| | | | |
|---|---|---|---|
| 790,252 | 5/1905 | Du Mahaut | 273/221 |
| 3,313,545 | 4/1967 | Bartsch | 273/218 |
| 4,085,937 | 4/1978 | Schenk | 273/218 |
| 4,625,964 | 12/1986 | Yamada | 273/220 X |
| 4,968,038 | 11/1990 | Yamada | 273/220 X |
| 4,979,746 | 12/1990 | Gentiluomo | 273/220 |

Primary Examiner—George J. Marlo

[57] ABSTRACT

A regulation golf ball, comprising:
(a) a low density center having a maximum diameter of 1.25 inches;
(b) a molded encapsulating mass surrounding said center, wherein the material in contact with said center is further characterized as a highly resilient synthetic elastomer composition having a minimum Shore A Durometer hardness of 70, and a minimum specific gravity of 1.00:
(c) and a patterned surface contouring of predetermined structure contained within the outer surface of said golf ball;
(d) said center having a compressibility of less than 10 percent of the compressibility of the material in contact therewith, and a density less than the maximum prevailing density of said encapsulating mass, for the purpose of effectuating an increase in ball moment of inertial.

9 Claims, 1 Drawing Sheet

GOLF BALL

BACKGROUND OF THE INVENTION

This invention relates to an improvement in presently available molded regulation type golf balls.

Regulation golf balls are made to United States Golf Association (U.S.G.A.) specifications, which specify in part that balls must be spherical in shape, have equal aerodynamic properties and equal moments of inertia about any axis through its center, and be constructed such as to have a minimum diameter of 1.68 inches, a maximum weight of 1.620 ounces, and a maximum initial ball velocity of 255 feet per second as measured on a standard U.S.G.A. ball testing machine.

Most presently manufactured molded golf balls are made of uniform density material throughout, or with a conventional cover encapsulating a substantially dense inner core. These balls are made from highly resilient synthetic elastomer compositions such as disclosed in U.S. Pat. Nos. 3,313,545; 3,502,338; 3,534,965; 3,572,721; 3,883,145 and 4,123,061.

SUMMARY OF THE INVENTION

The intent of this invention is to modify construction of presently available molded type golf balls, such as to reduce ball hooking and slicing action associated with improperly hit balls. It is an advantageous feature of this invention to locate a large portion of a ball's weight toward the outer portion of the ball. This essentially means that weight is design-wise removed from the center of a presently available solid molded ball and redistributed within the ball's outer portion. It should be noted that due to the removal of weight from the center of the ball, the density of the outer portion of the ball must be increased through the use of fillers in order to maintain the predetermined ball weight. The increased weight within the outer portion of the ball will operate to increase the ball's moment of inertia, and cause a reduction in Magnus Effect to a level for effectuating a reduction in ball hooking and slicing action.

To obtain a ball having a high moment of inertia, the density of the ball's center should be made as small as possible. This means that in order to construct a properly balanced ball, the center must be made rigid, so that it will assist toward maintaining sphericity of the inner surface of the encapsulating mass during the molding operation. To accomplish this, the ball must be made with a center having a compressibility of less than 10 percent of the compressibility of the surrounding material in contact therewith. A ball so constructed would provide good balance for aerodynamic stability, and true roll on the putting green. A center material suitable for use in the instant invention, is disclosed in Schenk (U.S. Pat. No. 4,085,937). Also, polypropylene having a specific gravity of 0.90, polyethylene having a specific gravity of 0.92, and blown or syntactic type rigid foams using polyurethane, polyvinyl chloride, or other elastomers may be used. The material in contact with the ball center can be made from synthetic elastomer compositions, such as disclosed in the patents cited supra, and modified to include an additional amount of dense filler material.

Terms herein used should be construed of follows:
1. Encapsulating Mass—It is defined to encompass the element or elements surrounding the ball's center.
2. Synthetic Elastomer Composition—It is defined as any material such as used in the manufacture of the molded golf balls disclosed in the herein cited prior art patents.
3. Syntactic Foam—It is defined as a lightweight material consisting of hollow spheres of either phenolic, epoxy, ceramic, or glass dispersed within an elastomer, and having a min. density of 0.38 gm/cc.
4. Compressibility—It relates to the amount of specimen deflection when subjected to a predetermined compressive load. In the instant case, comparison in compressibility is made by comparing the deflection of the spherical center, to the deflection of an equal size sphere of the encapsulating material which is in contact with said center.
5. Moment of Inertia—It is defined as the sum of the product of the mass of each particle in a body, and the square of its distance from a common axis.

DESCRIPTION OF THE PREFERRED EMBODIMENTS

Figure 1:
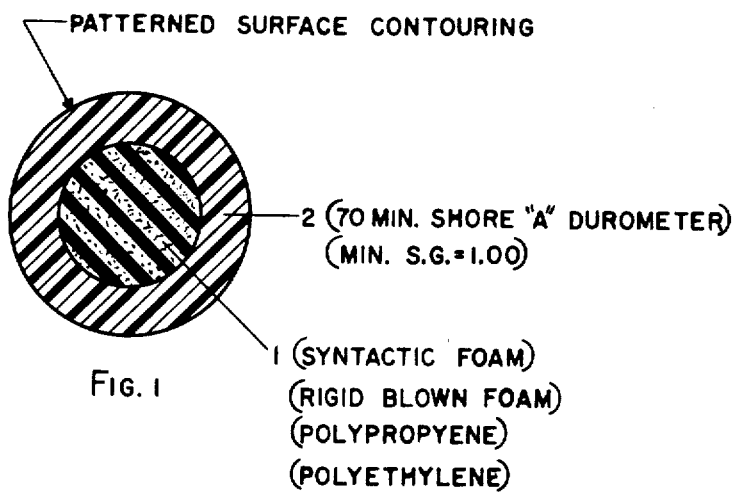
FIG. 1 depicts a cross sectional view of a two piece molded ball consisting of a center surrounded by a molded encapsulating mass.

I. Two-piece Molded Ball:

This embodiment is depicted in FIG. 1 and is constructed as a two-piece unit featuring a low density center 1 encapsulated by a highly resilient synthetic elastomer composition 2, which has a minimum Shore A Durometer hardness of about 70. Comtained within the surface of said synthetic elastomer composition 2, is a patterned surface contouring such as dimples. Center 1 can have a maximum diameter of 1.25 inches, and be made from polypropylene, polyethylene, or blown or syntactic foam.

Figure 2:
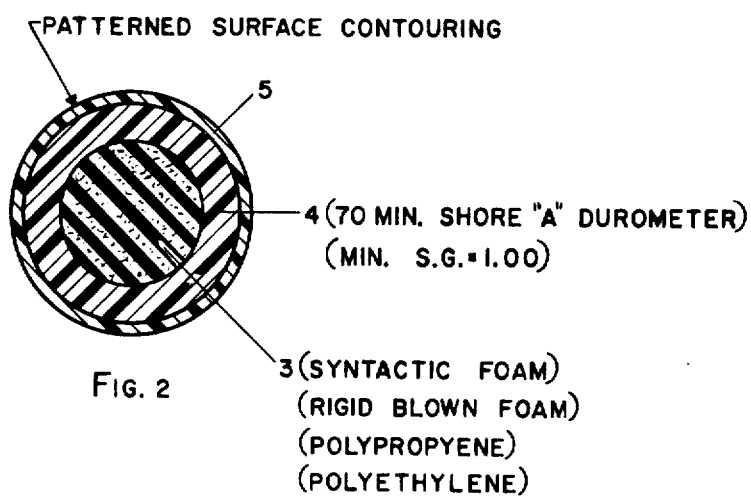
FIG. 2 depicts a cross sectional view of a three piece molded ball consisting of a center, surrounded by a molded elastomer which has an encapsulating cover.

II. Three-piece Molded Ball:

This embodiment is depicted in FIG. 2 and is constructed as a three-piece unit featuring a low density center 3, surrounded by a highly resilient synthetic elastomer composition 4 having a minimum Shore A Durometer hardness of about 70, and encapsulated by a cover 5 having a patterned surface contouring such as dimples. Cover 5 can be made from conventionally used materials such as balata, surlyn, ramlon, dynalon, etc. Center 3 can have a maximum diameter of 1.25 inches, and be made from the same materials disclosed for center 1 of the two-piece ball.

To manufacture golf balls in accordance with the instant invention, conventional processes and techniques presently employed in the art can be used. Therefore, since said processes and techniques are well documented and known, manufacturing details will not be presented herein.

Having thusly described the invention, the following is claimed:

1. A regulation golf ball, comprising:
   (a) a low density center having a maximum diameter of 1.25 inches;
   (b) a molded encapsulating mass surrounding said center, wherein the material in contact with said center is further characterized as a highly resilient synthetic elastomer composition having a minimum Shore A Durometer hardness of 70, and a minimum specific gravity of 1.00;

(c) and a patterned surface contouring of predetermined structure contained within the outer surface of said golf ball;

(d) said center having a compressibility of less than 10 percent of the compressibility of the material in contact therewith, and a density less than the maximum prevailing density of said encapsulating mass, for the purpose of effectuating an increase in ball moment of inertia.

2. The golf ball defined in claim 1, wherein said center is further characterized as being made from a syntactic foam.

3. The golf ball defined in claim 2, wherein said encapsulating mass is further characterized as including a cover.

4. The golf ball defined in claim 1, wherein said center is further characterized as being made from a rigid blown foam.

5. The golf ball defined in claim 4, wherein said encapsulating mass is further characterized as including a cover.

6. The golf ball defined in claim 1, wherein said center is further characterized as being made from polypropylene.

7. The golf ball defined in claim 6, wherein said encapsulating mass is further characterized as including a cover.

8. The golf ball defined in claim 1, wherein said center is further characterized as being made from polyethylene.

9. The golf ball defined in claim 8, wherein said encapsulating mass is further characterized as including a cover.

* * * * *

UNITED STATES PATENT AND TRADEMARK OFFICE
CERTIFICATE OF CORRECTION

PATENT NO. : 5,026,067

DATED : June 25, 1991

INVENTOR(S) : Joseph A. Gentiluomo

It is certified that error appears in the above-identified patent and that said Letters Patent is hereby corrected as shown below:

The title page should be deleted and substitute therefor the attached title page.

The Drawing Sheet, consisting of Figs. 1 and 2, should be added as shown on the attached page.

Signed and Sealed this

Fifth Day of January, 1993

Attest:

DOUGLAS B. COMER

*Attesting Officer*      Acting Commissioner of Patents and Trademarks

United States Patent [19]

Gentiluomo

[11] Patent Number: 5,026,067

[45] Date of Patent: Jun. 25, 1991

[54] GOLF BALL

[76] Inventor: Joseph A. Gentiluomo, 1456 Belmont Ave., Schenectady, N.Y. 12308

[21] Appl. No.: 611,290

[22] Filed: Nov. 8, 1990

[51] Int. Cl.$^5$ ............................................. A63B 37/06
[52] U.S. Cl. ................................. 273/220; 273/230; 273/228
[58] Field of Search ............... 273/218, 219, 220, 221, 273/230, 235 R, 62, 228, 229

[56] References Cited

U.S. PATENT DOCUMENTS

| | | | |
|---|---|---|---|
| 790,252 | 5/1905 | Du Mahaut | 273/221 |
| 3,313,545 | 4/1967 | Bartsch | 273/218 |
| 4,085,937 | 4/1978 | Schenk | 273/218 |
| 4,625,964 | 12/1986 | Yamada | 273/220 X |
| 4,968,038 | 11/1990 | Yamada | 273/220 X |
| 4,979,746 | 12/1990 | Gentiluomo | 273/220 |

Primary Examiner—George J. Marlo

[57] ABSTRACT

A regulation golf ball, comprising:
(a) a low density center having a maximum diameter of 1.25 inches;
(b) a molded encapsulating mass surrounding said center, wherein the material in contact with said center is further characterized as a highly resilient synthetic elastomer composition having a minimum Shore A Durometer hardness of 70, and a minimum specific gravity of 1.00:
(c) and a patterned surface contouring of predetermined structure contained within the outer surface of said golf ball;
(d) said center having a compressibility of less than 10 percent of the compressibility of the material in contact therewith, and a density less than the maximum prevailing density of said encapsulating mass, for the purpose of effectuating an increase in ball moment of inertial.

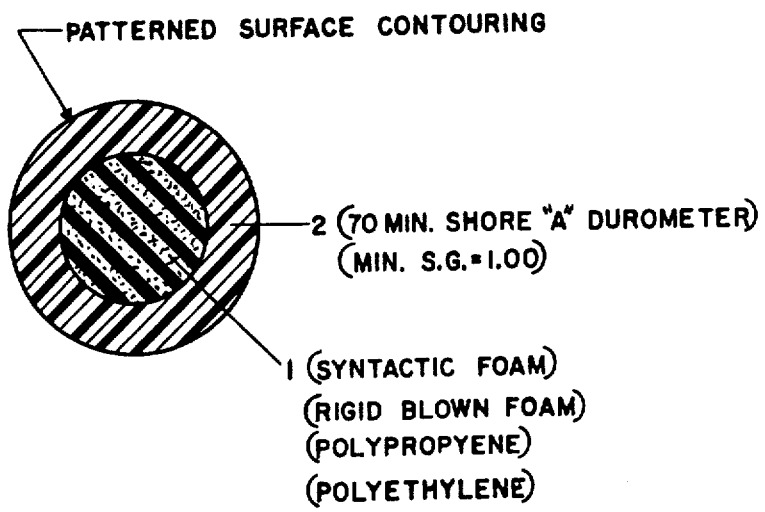

9 Claims, 1 Drawing Sheet